(12) United States Patent
Res

(10) Patent No.: US 10,186,998 B2
(45) Date of Patent: Jan. 22, 2019

(54) COLD START ALTERNATOR

(71) Applicant: Giuliano Res, Five Dock (AU)

(72) Inventor: Giuliano Res, Five Dock (AU)

(*) Notice: Subject to any disclaimer, the term of this patent is extended or adjusted under 35 U.S.C. 154(b) by 0 days.

(21) Appl. No.: 15/324,068

(22) PCT Filed: Jul. 6, 2015

(86) PCT No.: PCT/AU2015/000405
§ 371 (c)(1),
(2) Date: Jan. 5, 2017

(87) PCT Pub. No.: WO2016/004467
PCT Pub. Date: Jan. 14, 2016

(65) Prior Publication Data
US 2017/0201197 A1    Jul. 13, 2017

(30) Foreign Application Priority Data
Jul. 6, 2014    (AU) .............................. 2014902598

(51) Int. Cl.
*H02P 9/08* (2006.01)
*H02P 9/10* (2006.01)
*H02P 29/024* (2016.01)

(52) U.S. Cl.
CPC .............. *H02P 9/107* (2013.01); *H02P 9/08* (2013.01); *H02P 29/027* (2013.01); *H02P 29/0241* (2016.02)

(58) Field of Classification Search
USPC .................................. 322/8; 363/98; 123/598
See application file for complete search history.

(56) References Cited

U.S. PATENT DOCUMENTS

| | | | | | |
|---|---|---|---|---|---|
| 3,612,895 A | * | 10/1971 | Niedra | ................. | H03K 17/601 307/419 |
| 3,648,225 A | * | 3/1972 | Kritz | ....................... | G01S 15/60 367/114 |
| 3,660,729 A | * | 5/1972 | James | ................. | G07C 9/00182 361/172 |
| 3,818,477 A | * | 6/1974 | Odams | .................... | G01S 1/308 342/396 |
| 3,875,518 A | * | 4/1975 | Odams | .................... | G01S 1/308 324/76.79 |
| 3,984,750 A | * | 10/1976 | Pfeffer | .................. | H02J 7/1484 322/32 |
| 4,015,576 A | * | 4/1977 | Junak | ....................... | F02P 9/007 123/598 |
| 4,514,686 A | * | 4/1985 | Mayfield | ................ | G01R 21/00 324/142 |

(Continued)

OTHER PUBLICATIONS

Written Opinion dated Sep. 22, 2015 in corresponding International Application No. PCT/AU2015/000405.

(Continued)

*Primary Examiner* — Pedro J Cuevas
(74) *Attorney, Agent, or Firm* — Stephen J. Weyer, Esq.; Stites & Harbison, PLLC

(57) ABSTRACT

An alternator having associated therewith a power and control circuit, the circuit enabling the alternator to continue its operation during either an excessive electrical load or a short circuit; wherein, the circuit is capable of isolating at least one polarity of at least one phase of a power supply to thereby provide power at least for control circuitry.

27 Claims, 1 Drawing Sheet

(56) References Cited

U.S. PATENT DOCUMENTS

| | | | | |
|---|---|---|---|---|
| 4,876,614 A * | 10/1989 | Kaaden | G11B 5/588 | 386/204 |
| 5,194,126 A * | 3/1993 | Packalin | B23H 5/04 | 204/217 |
| 5,627,742 A * | 5/1997 | Nakata | B60L 9/22 | 323/235 |
| 5,717,584 A * | 2/1998 | Rajashekara | H02M 7/5387 | 363/132 |
| 5,811,949 A * | 9/1998 | Garces | H02M 7/53875 | 318/448 |
| 5,917,721 A * | 6/1999 | Kerkman | H02M 7/53875 | 363/41 |
| 6,109,926 A * | 8/2000 | Blum | H01R 35/025 | 439/13 |
| 7,501,726 B1 * | 3/2009 | Waters | H02K 35/00 | 310/36 |
| 7,692,340 B2 * | 4/2010 | Waters | H02K 35/00 | 310/36 |
| 7,768,213 B2 * | 8/2010 | Bleukx | H05B 41/2806 | 315/276 |
| 7,812,277 B2 * | 10/2010 | Buhler | B23H 7/04 | 219/69.18 |
| 8,416,175 B2 * | 4/2013 | Hong | G09G 3/3614 | 345/96 |
| 8,796,969 B2 * | 8/2014 | Goetz | H02P 27/08 | 318/400.23 |
| 2001/0020850 A1 * | 9/2001 | McIntosh | B81B 3/0086 | 324/519 |
| 2007/0023399 A1 * | 2/2007 | Buhler | B23H 1/022 | 219/69.18 |
| 2008/0309590 A1 * | 12/2008 | Hong | G09G 3/3614 | 345/52 |
| 2009/0167034 A1 * | 7/2009 | Waters | H02K 35/00 | 290/1 R |
| 2009/0174339 A1 * | 7/2009 | Bleukx | H05B 41/2806 | 315/276 |
| 2010/0043641 A1 | 2/2010 | Thome | | |
| 2011/0058399 A1 * | 3/2011 | Honsberg | H02M 7/487 | 363/98 |
| 2014/0347903 A1 | 11/2014 | Ritchey et al. | | |

OTHER PUBLICATIONS

International Search Report dated Sep. 22, 2015 in corresponding International Application No. PCT/AU2015/000405.

* cited by examiner

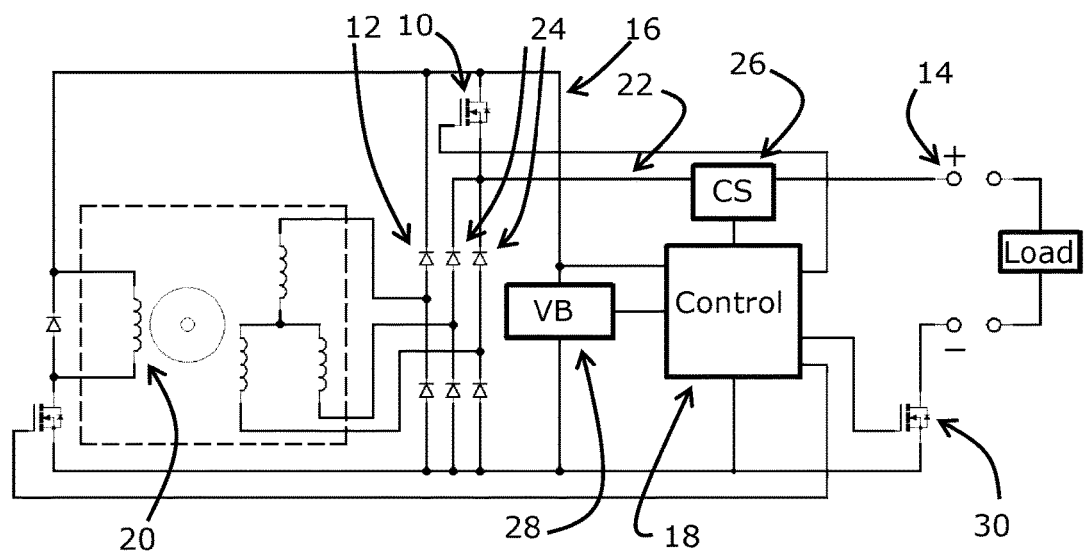

COLD START ALTERNATOR

BACKGROUND OF THE INVENTION

The present invention relates to electrical machinery and more particularly relates to improvements in the operation of alternators used in such machinery. The present invention also relates to improvements in the performance of such alternators such as those which are used in particular though not exclusively, in dangerous environments such as occurs in underground mining. More particularly the present invention provides improvements in the circuitry associated with alternators which allows cold starting under load and without a battery.

PRIOR ART

Alternators are widely used in industry and mining environments. An alternator is used in conjunction with other machinery and in use, converts the mechanical power from a rotating shaft into electrical power and heat. The electric power generated is typically used to drive electrical equipment. Efficiency of alternators is limited by various operational factors including fan cooling loss, bearing loss, iron loss, copper loss, and the voltage drop in the diode bridges. Alternators are commonly used to provide electrical power in vehicles and other equipment. Generally they are used in conjunction with a rechargeable battery but, in the mining and petrochemical industries for example, alternators are used without a battery for safety reasons.

Alternators heretofore devised and utilized are known to consist basically of familiar, expected and obvious structural configurations, notwithstanding the plurality of designs encompassed by the prior art which have been developed for the fulfillment of the objectives and requirements of alternator power generation. Flameproof alternators are used in hazardous explosive environments often found in the mining and petrochemical industries. While these devices fulfil their respective functions, particular objectives and requirements, the aforementioned prior art does not disclose an alternator which includes circuitry which enables an alternator to direct power to a load when a heavy electrical load or short circuit occurs.

Common alternators have a rotor designed to deliver a changing magnetic field to three sets of stator windings which provide three phase power to a rectifier bridge circuit having six power diodes. Some of the current from the rectifier bridge is used to power a field coil which controls the strength of the rotating magnetic field that induces current in the stator windings. The voltage produced by the stator windings is proportional to both the strength of the magnetic field and the rotational speed of the rotor. The change in the strength of the magnetic field is proportional to the current through the field coil. A regulator controls the field coil's current to deliver a specified voltage at the output terminals. For a given rotational speed the braking torque produced by the alternator is proportional to the current drawn by the load.

The maximum magnetic field of a common alternator is achieved when the current through the field coil reaches the magnetic saturation point of the alternators components. During normal operation an alternator delivers a regulated output voltage. Some loads draw excessive current when initially applied, such as cold incandescent lights, which causes the output voltage to drop for a short period below the regulated voltage. When the output voltage dips the alternator loses regulation.

When an alternator is overloaded the regulator delivers the maximum field coil current. During this maximum regulation the magnetic field is fairly proportional to the output voltage which is in turn fairly proportional to the magnetic field. The output voltage will drop for any given overload which also reduces the output current until an equilibrium point is reached. Notably, the current through a short circuit on the output terminals is much less than the maximum output current during normal operation.

When an alternator starts-up with a heavy load connected, and where a battery or power supply is not used, the heavy load prevents the output voltage of the alternator from reaching a critical or minimum excitation threshold that would allow the alternator to power right up and drive the load correctly. In this situation the operator needs to turn on the heavy load in stages to allow the alternator to maintain regulation.

In equipment that ideally requires an alternator that has control circuitry which needs to operate during a short circuit or heavy load, power for the control circuitry needs to be provided either externally or derived internally in some way from the very small three phase stator voltages.

In the past, it has generally not been possible in self exciting equipment which does not include a battery as is common in the mining and petrochemical industries or a design having quite large permanent magnets, to start up under maximum electrical load. There is therefore a long felt want to provide an alternator which is capable of continued operation in the event of a short circuit or heavy electrical load during start up and which is capable of deriving power internally when there is no battery or external power source.

INVENTION

With this in mind, the present invention provides for self-exciting battery-less equipment, circuitry adapted to allow equipment associated with the alternator to start up under maximum load which has not in the past been possible, without a battery or a design having quite large permanent magnets. The present invention further provides improvements in the operation of alternators when no battery power or external power is available during start up of equipment with which the alternator is used. The present invention also provides improvements in the performance of such alternators such as those which are used in particular though not exclusively, in dangerous environments such as occurs in underground mining. More particularly the present invention provides improvements in the circuitry associated with alternators which allows cold starting of equipment while a maximum power is delivered from the alternator and without using a battery or large permanent magnets.

The present invention provides a power and control circuit for an alternator which enables the alternator to continue its operation during either an excessive load or a short circuit by isolating at least one polarity of at least one phase to provide power for the control circuitry and/or the field coil.

In its broadest for the present invention comprises:
an alternator having associated therewith a power and control circuit, the circuit enabling the alternator to continue its operation during either an excessive electrical load or a short circuit; wherein, the circuit is capable of isolating at least one polarity of at least one phase of a power supply to thereby provide power at least for control circuitry. The alternator further comprises at least one electronic or electromechanical switch, each switch capable of disconnection of said at least one a single phase of said power supply.

In another broad form the present invention comprises: a power control circuit for an alternator; the circuit enabling the alternator to continue its operation during either an excessive electrical load or a short circuit; wherein, the circuit is capable of isolating at least one polarity of at least one phase of a power supply to thereby provide power at least for control circuitry.

The present invention provides an alternative to the known prior art and the shortcomings identified. The foregoing and other objects and advantages will appear from the description to follow. In the description reference is made to the accompanying representations, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying illustrations, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

The present invention will now be described in broad detail according to preferred but non limiting embodiments wherein;

FIG. 1 shows a schematic arrangement of a circuit associated with an alternator in which at least one phase can be isolated to enable supply power to the circuit to enable start up of a load.

DETAILED DESCRIPTION

Although the invention will be described according to a preferred embodiment, it will be appreciated that other variants are contemplated. The design and construction may be variously modified, without departing from the spirit and scope of the invention, as defined herein.

Referring to FIG. 1 there is shown a schematic circuit block diagram of a preferred embodiment of the power circuit 1 for an alternator 2. An n-channel power MOSFET 10 is connected in series with one of the three phase rectifier bridge's power diodes 12 that normally delivers current to the positive output terminal 14. The MOSFET 10 is a type of transistor known as a metal-oxide-semiconductor field-effect transistor which is used for amplifying or switching electronic signals using changes in voltage. When the transistor is off no current can flow so it is as if the wires on the device which the transistor is used with are disconnected. A MOSFET is normally connected to a device which requires turning on and off. When the transistor is on power can flow so it is as if the wires on the device which the transistor is used with are connected.

The power line 16 between the power diode 12 and the power MOSFET 10 is used to power the control circuitry 18 and the field coil 20. A power line 22 connects the other two power diodes 24 to the power MOSFET 10. In the preferred embodiment an optional current sensor 26 is used to connect the power line 22 and the positive output terminal 14 and to measure the output current. In normal operation the power MOSFET 10 is on, thereby connecting the power lines 16 and 22 so current can flow in either direction. When the power MOSFET 10 is on the circuit operates similarly to a standard three phase alternator.

The gate drive voltage for the power MOSFET 10 needs to be at least several volts higher than the power line 22 voltage. To provide this voltage a voltage booster 28 increases the voltage from the power line 16 to provide the required gate voltage.

During normal operation the power MOSFET 10 is turned on by the control circuitry 18 so current can flow in both directions across the power MOSFET 10. When an overload or short circuit occurs the output voltage drops. When the output voltage is below a threshold voltage the control circuitry turns off the power MOSFET 10 to disconnect the power line 16 from the power line 22. The power line 16 continues to provide power to the control circuitry 18, the field coil 20 and the voltage booster 28. The power line 22 continues to provide some current to the load or short circuit.

A heavy load may have a very low turn on impedance and require adequate current for a short period to develop its normal operating impedance. The circuit according to the preferred embodiment of the invention provides this current since the field coil current is being supplied by the power line 16 which can provide the maximum field. As the load's impedance increases, the output voltage increases. This ramping up process quickly results in the output voltage exceeding a certain threshold where the control circuitry 18 turns on the power MOSFET 10 and the alternator begins to operate as normal.

In another embodiment, the electronic or electromechanical switch MOSFET 10, shown in the preferred embodiment, is situated in series with a phase before the rectifier or rectifiers. In this case the whole phase is disconnected from the load and the power from the phase can be used in any way as required.

In the preferred embodiment, when the control circuitry detects an overload or short circuit for a specified duration it turns off the output by turning off the electromechanical or electronic switch 30. This also allows the appropriate start-up current to be delivered to loads that initially overload the alternator. The control circuitry also provides feedback to the operator of the fault through some appropriate means. After resolving the fault the operator resets the fault condition through some appropriate means. Electronic switch 30 is initially turned off so the control circuitry can ensure the alternator has, for instance, adequate rotational speed to be able to drive the load. The electronic switch 30 can be used as desired to connect or disconnect the load.

For self-exciting battery-less equipment, as is common in the mining and petrochemical industries, the present invention can start up under maximum load. Generally this is not possible without a battery or a design having quite large permanent magnets.

In other embodiments the power MOSFET 10 could be a p-channel MOSFET and the associated circuit modified to provide the required negative gate control drive voltage. Also, in other embodiments the power MOSFET 10 could be placed in series with a power diode 14 which powers the negative output terminal. The power MOSFET 10 could be implemented as any suitable electronic or electromechanical switch. A rectifier bridge is typically constructed using diodes but may be implemented in other ways such as an active bridge using electromechanical or electronic switches.

In another embodiment the control circuitry 18 uses a current threshold instead of a voltage threshold for either or both of the transition thresholds. According to a further embodiment the alternator includes coils mounted to the rotor, instead of stator windings, and brushes used to conduct the power from these coils to conductors attached to the main body. In a further embodiment there are provided phase switches on positive and negative phase polarities of one or more phases. According to another embodiment, there are provided a permanent magnet or magnets used in conjunction with or instead of a field coil.

The claims defining the invention are as follows:

1. An alternator having associated therewith a power and control circuit, the circuit enabling the alternator to continue its operation during either an excessive electrical load or a short circuit; wherein, the circuit is capable of isolating at least one polarity of at least one phase of a power supply to thereby provide power at least for control circuitry; the circuit further comprising at least one electronic or electromechanical switch, each switch capable of disconnection of said at least one single phase of said power supply; and control circuitry for detecting an overload or short circuit on the alternator's output terminals and a controller for controlling the electronic or electromechanical switch or switches so that the switch or switches are closed during normal operation.

2. An alternator according to claim 1 wherein, the isolation of a single polarity of said at least one phase, isolates power from said at least one single phase to an electrical load.

3. An alternator according to claim 2 wherein, power from one said at least one isolated phase is useable to provide current to the load when induced by equipment or another device associated with the alternator.

4. An alternator according to claim 3 wherein, when power from said at least one isolated phase is used to power the circuit, one or more additional phases provide current to the load.

5. An alternator according to claim 4 wherein each said at least one electronic or electromechanical switch is arranged in series with a rectifier.

6. An alternator according to claim 5 wherein the switch or switches comprise/s a metal-oxide-semiconductor field-effect transistor [MOSFET] capable of amplifying or switching electronic signals using changes in voltage.

7. An alternator according to claim 6 wherein the metal-oxide-semiconductor field-effect transistor is connected in series with one of three phase rectifier bridge's power diodes that deliver current to a positive output terminal.

8. An alternator according to claim 7 wherein when the transistor is off no current flows to the load and when the transistor is on current flows to the load.

9. An alternator according to claim 8 wherein the excessive electrical load occurs during start up of an item of electrical power drawing equipment.

10. An alternator according to claim 9 further comprising:
a rectifier connected to a phase of stator windings of the alternator; and
control circuitry for detecting an overload or short circuit on the alternator's output terminals and a controller for controlling the electronic or electromechanical switch or switches so that the switch or switches are closed during normal operation.

11. An alternator according to claim 10 wherein a first power line between a first power diode and the power MOSFET is used to power the control circuitry and/or the field coil.

12. An alternator according to claim 11 wherein a second power line connects two other power diodes to the power MOSFET.

13. An alternator according to claim 12 further comprising a current sensor interposed between the first power line and the positive output terminal to enable measurement of the output current.

14. An alternator according to claim 13 wherein current flows in either direction when the power MOSFET is on and connecting the first and second power lines.

15. An alternator according to claim 14 wherein the circuit further comprises a voltage booster which increases the voltage from the first power line to provide the required gate drive voltage for the MOSFET.

16. An alternator according to claim 15 wherein the gate drive voltage for the power MOSFET is at least several volts higher than the second power line voltage.

17. An alternator according to claim 16 wherein during normal operation, the power MOSFET is turned on by the control circuitry to enable current to flow in both directions across the power MOSFET.

18. An alternator according to claim 17 wherein, when the output voltage is below a threshold voltage, the control circuitry turns off the power MOSFET to disconnect the first power line from the second line.

19. An alternator according to claim 18 wherein, when an overload or short circuit occurs, the output voltage drops.

20. An alternator according to claim 19 wherein during normal operation the first power line continues to provide power to the control circuitry, the field coil and the voltage booster.

21. An alternator according to claim 20 wherein the power MOSFET, is disposed in series with a phase before a rectifier or rectifiers.

22. An alternator according to claim 21 wherein a whole phase is disconnected from the load and the power from the phase can be used in any way as selected.

23. An alternator according to claim 22 wherein the alternator includes coils mounted to a rotor and brushes to conduct the power from these coils to conductors attached to the main body of the alternator.

24. An alternator according to claim 23 wherein the switch or switches are open during an electrical overload, thereby allowing disconnected power to be used for powering the control circuitry.

25. An alternator according to claim 23 wherein the switch or switches are open during an electrical overload allowing disconnected power to be used for powering the field coil.

26. An alternator according to claim 23 wherein the switch or switches are open during an electrical overload allowing disconnected power to be used for powering the control circuitry and the field coil.

27. A power control circuit for an alternator; the circuit enabling the alternator to continue its operation during either an excessive electrical load or a short circuit; wherein, the circuit is capable of isolating at least one polarity of at least one phase of a power supply to thereby provide power at least for control circuitry; the circuit further comprising at least one electronic or electromechanical switch, each switch capable of disconnection of said at least one single phase of said power supply; and control circuitry for detecting an overload or short circuit on the alternator's output terminals and a controller for controlling the electronic or electromechanical switch or switches so that the switch or switches are closed during normal operation.

* * * * *